(12) United States Patent
Wills

(10) Patent No.: US 12,134,475 B2
(45) Date of Patent: Nov. 5, 2024

(54) EMERGENCY PASSAGE DOOR

(71) Applicant: Safran Seats GB Limited, Cwmbran (GB)

(72) Inventor: Paul John Wills, Cwmbran (GB)

(73) Assignee: SAFRAN SEATS GB LIMITED, Cwmbran (GB)

( * ) Notice: Subject to any disclaimer, the term of this patent is extended or adjusted under 35 U.S.C. 154(b) by 123 days.

(21) Appl. No.: 17/771,451

(22) PCT Filed: Oct. 29, 2020

(86) PCT No.: PCT/IB2020/060176
§ 371 (c)(1),
(2) Date: Apr. 22, 2022

(87) PCT Pub. No.: WO2021/084479
PCT Pub. Date: May 6, 2021

(65) Prior Publication Data
US 2022/0396986 A1    Dec. 15, 2022

Related U.S. Application Data

(60) Provisional application No. 62/927,411, filed on Oct. 29, 2019.

(51) Int. Cl.
*B64D 11/06* (2006.01)
*B64D 11/00* (2006.01)
(Continued)

(52) U.S. Cl.
CPC ...... *B64D 11/0606* (2014.12); *B64D 11/0023* (2013.01); *E05C 19/02* (2013.01);
(Continued)

(58) Field of Classification Search
CPC ............ B64D 11/0606; B64D 11/0023; E05D 15/063; E05D 15/0643; E05D 15/0652;
(Continued)

(56) References Cited

U.S. PATENT DOCUMENTS 5,404,675 A * 4/1995 Schmidhauser ...... E05D 15/063
16/97
5,704,661 A * 1/1998 Takimoto .............. E05C 19/028
292/162
(Continued)

FOREIGN PATENT DOCUMENTS

CA    3047149 A1    7/2018
GB    2548901 A    10/2017
(Continued)

OTHER PUBLICATIONS

English translation for WO2018184778A1.*
(Continued)

*Primary Examiner* — Justin B Rephann
(74) *Attorney, Agent, or Firm* — Kilpatrick Townsend & Stockton LLP

(57) ABSTRACT

Described are passenger door assemblies including emergency passage feature assemblies. For example, a door assembly may include a latching block configurable to retain a latching spigot of a carriage assembly responsive to a first opening force. The door assembly may also be configurable to release the latching spigot to enable sliding movement of the latching block independent of the carriage assembly responsive to a second opening force.

13 Claims, 11 Drawing Sheets

(51) Int. Cl.
  *E05C 19/02* (2006.01)
  *E05D 15/06* (2006.01)
  *E05B 65/08* (2006.01)

(52) U.S. Cl.
  CPC ............ *E05D 15/063* (2013.01); *E05B 65/08* (2013.01); *E05Y 2800/252* (2013.01); *E05Y 2900/502* (2013.01)

(58) Field of Classification Search
  CPC ............ E05D 15/0678; E05D 15/0656; E05D 15/0647; E05Y 2800/252; E05Y 2900/502; E05C 19/02; E05C 19/028; E05B 65/08; E05B 65/0864
  See application file for complete search history.

(56) References Cited

U.S. PATENT DOCUMENTS

| | | | | |
|---|---|---|---|---|
| 6,209,171 | B1* | 4/2001 | Pelletier | E05D 15/063 403/374.5 |
| 7,117,559 | B1* | 10/2006 | Barber | E05D 15/063 16/105 |
| 2013/0241247 | A1* | 9/2013 | Wallace | B64D 11/0604 297/118 |
| 2016/0298370 | A1* | 10/2016 | Druckman | E05D 15/0656 |
| 2017/0283064 | A1* | 10/2017 | Robinson | E05D 15/58 |
| 2018/0281963 | A1* | 10/2018 | Dowty | B64D 11/0606 |
| 2019/0063113 | A1 | 2/2019 | Milligan et al. | |
| 2019/0210733 | A1* | 7/2019 | Herault | B64D 11/0604 |
| 2019/0329891 | A1* | 10/2019 | Bonnefoy | B64D 11/0023 |
| 2020/0122838 | A1* | 4/2020 | Bonnefoy | B64D 11/0023 |
| 2022/0332423 | A1* | 10/2022 | Thomas | B64D 11/0023 |
| 2022/0355935 | A1* | 11/2022 | Rees | B64D 11/0023 |

FOREIGN PATENT DOCUMENTS

| | | |
|---|---|---|
| JP | 5084035 B2 | 11/2012 |
| KR | 200444723 Y1 | 6/2009 |
| WO | 2018033599 A1 | 2/2018 |
| WO | 2018093825 A1 | 5/2018 |
| WO | 2018184778 A1 | 10/2018 |
| WO | 2021084249 A1 | 5/2021 |

OTHER PUBLICATIONS

International Patent Application No. PCT/IB2020/060176, International Search Report and Written Opinion, dated Jan. 25, 2021.

* cited by examiner

EMERGENCY PASSAGE DOOR

CROSS REFERENCE TO RELATED APPLICATION

This application claims the benefit of U.S. Provisional Application No. 62/927,411, filed on Oct. 29, 2019, and entitled EMERGENCY PASSAGE FEATURE FOR EXTERNALLY HUNG SUITE DOOR, the content of which is hereby incorporated by reference in its entirety.

FIELD OF THE INVENTION

The field of the disclosure relates to passage doors within passenger aircrafts. In particular, passage doors for passenger suites including emergency passage features are described.

BACKGROUND

Some passenger aircraft include mini-suites, which, especially on aircraft designed for long hauls, define semi-private spaces for passengers. For example, these mini-suites may each include a passenger seat, a small table, and a seat shell having short walls surrounding the space. Each mini-suite may have its own door for accessing the mini-suite. To comply with government regulations, each door may also be outfitted with an emergency passage feature (EPF). The EPF provides an alternate means for opening the door in the event that the door becomes jammed. Conventional doors including EPF systems may be overly mechanically complex, may be prone to jamming (even when the EPF is deployed), and/or may open into passenger aisles, thereby obstructing passenger movement.

SUMMARY

Examples of the disclosed embodiments covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a door assembly mountable to a moveable door is described. The door assembly includes a latching block configured to mount to the moveable door and is alignable with a slide axis of a slide track that is mounted to a fixed wall. The latching block is configured to selectively retain a latching spigot of a carriage assembly that is slidably mounted to the slide track. The latching block is configured to retain the latching spigot to enable sliding movement of the latching block and the carriage assembly on the slide track, when a first opening force is applied at the moveable door along the slide axis. The latching block is also configured to release the latching spigot to enable sliding movement of the latching block independent of the carriage assembly, when a second opening force that is greater than the first opening force is applied at the moveable door along the slide axis.

Another general aspect includes a passenger accommodation system, including a fixed wall forming a fixed part of a seating compartment; a moveable door forming a moveable part of the seating compartment; a slide track mounted to the fixed wall and defining a slide axis; a carriage assembly slidably mountable to the slide track via one or more slide carriages to enable slidable movement of the carriage assembly along the slide axis, the carriage assembly including a latching spigot aligned with the slide axis; and a door assembly configured to mount to the moveable door and mate with the carriage assembly to enable slidable movement of the moveable door with respect to the fixed wall. The door assembly includes a latching block aligned with the slide axis and configured to selectively receive the latching spigot by at least: (1) responsive to a first opening force applied at the moveable door, retaining the latching spigot to enable the moveable door, the carriage assembly, and the door assembly to slide along the slide track; and (2) responsive to a second opening force applied at the moveable door, the door assembly also includes releasing the latching block to enable the latching block and the moveable door to slide with respect to the fixed wall independent of the carriage assembly.

Another general aspect includes a method of operating a moveable passenger door, including: opening the moveable passenger door by applying an opening force in a first direction towards a fixed wall and along a slide axis. The opening force causes the moveable passenger door to translate with respect to the fixed wall via a carriage assembly that is removably coupled to the moveable passenger door via a door assembly and slidably connected to a slide track of the fixed wall. The method also includes opening the moveable passenger door by applying an emergency force in the first direction towards the fixed wall and along the slide axis. The emergency force may cause the door assembly to decouple from the carriage assembly, and the moveable passenger door to translate with respect to the fixed wall via the door assembly independent of the carriage assembly.

DETAILED DESCRIPTION

Figure 1:
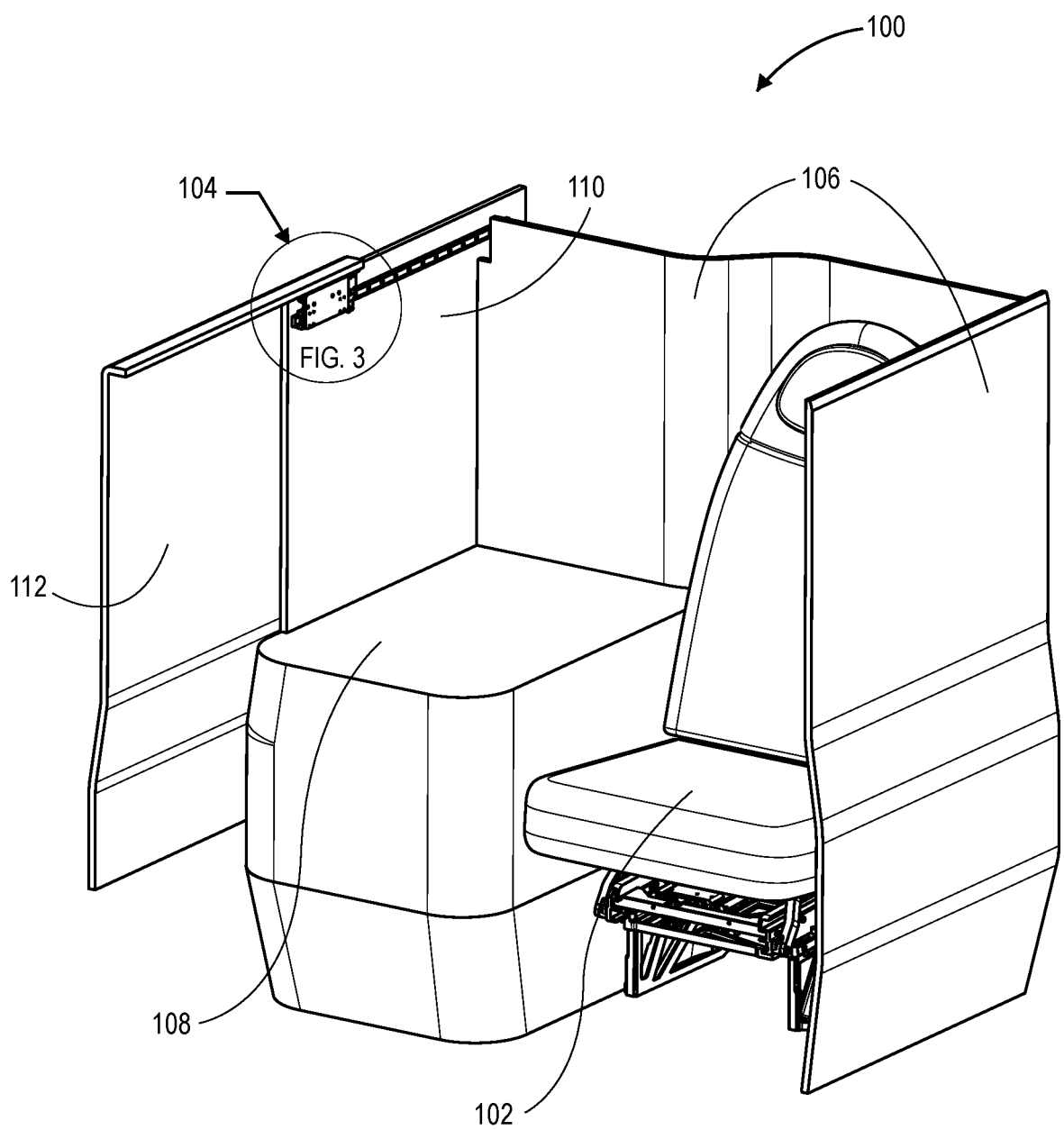
FIG. 1 shows an isometric view of a passenger accommodation system including a passenger seat and a passage door assembly, according to at least one example.

The subject matter of examples of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described examples of the disclosure provide various passage door assemblies including emergency passage features for use on passenger accommodation systems of passenger aircraft and/or in other passenger locations where privacy or semi-privacy may be desired. Unlike conventional passage assemblies including emergency passage features, those described herein include a single moveable door that is opened in the normal mode and the emergency mode using the same action. In particular, to open the moveable door in the normal operating mode, a passenger simply exerts a first opening force (e.g., 3-4 lbs) on the moveable door in an opening direction. To open the door in the emergency mode (e.g., if the main opening structure gets jammed), the passenger exerts a second slightly greater opening force (e.g., 6-8 lbs) at the same location on the moveable door and in the same direction. In some examples, the greater opening force is 3 to 4 times greater than the first opening force. Resetting the moveable door (e.g., after emergency operation) is also simplified in comparison to conventional passage door assemblies that include various mechanical levers and/or hinged parts. To do so, a force that is about equal in magnitude to the second opening force is exerted at the moveable door but in a direction opposite the opening forces. Additionally, because the door slides forward and aft in one plane, there is little to no possibility that the door will obstruct the passenger seating area or an adjacent passenger aisle as do conventional doors that swing.

In a particular example, a passenger accommodation system such as a mini-suite includes a passenger seat located within a semi-private area defined by a seat shell including at least one fixed wall and a moveable door. The fixed wall and the moveable door may be oriented in a coplanar orientation and slidably coupled such that the moveable door slides with respect to the fixed wall. To enable the slidable coupling, a slide track, a carriage assembly, and a door assembly are provided. The slide track is connected to the fixed wall and defines a slide axis of the moveable door extending generally forward and aft with respect to the passenger seat. The carriage assembly is slidably mounted to the slide track via one or more slide carriages. The carriage assembly also includes a latching spigot that is generally aligned with the slide axis. The door assembly is mounted to the moveable door and includes a latching block to selectively retain the latching spigot of the carriage assembly. In a normal operating mode, the latching spigot is held by the latching block such that the carriage assembly and the moveable door together slide along the slide track. In an emergency operating mode, the latching spigot is removed from the latching block (e.g., by an emergency opening force), thereby freeing the moveable door from the carriage assembly and enabling the moveable door to slide freely along a top edge of the fixed wall, i.e., disconnected from the slide track but along the same slide axis (e.g., generally forward and aft). In some examples, rollers are provided at the top edge of the fixed wall and on an underside of the moveable door to improve sliding of the moveable door in the emergency operating mode.

Turning now to the figures, FIG. 1 shows an isometric view of a passenger accommodation system 100 including a passenger seat 102 and a passage door assembly 104, according to at least one example. Multiple ones of the passenger accommodation system 100 may be disposed within an aircraft or other vehicle to provide semi-private or entirely private spaces for passenger occupation during travel. In some examples, an entire passenger seating area of the aircraft is devoted to passenger accommodation systems 100 of the same type. In other examples, different classes of seating areas may be provided in the aircraft, including certain areas that include similar passenger accommodation systems 100, traditional dense row and column seating, and other seating arrangements. In some examples, multiple passenger accommodation systems 100 are laid out in a grid pattern within a seating area, with the passenger seats 102 oriented generally forward in the aircraft, and passenger accommodation systems 100 running forward to aft in columns and being separated by longitudinal aisles. Thus, a single aisle may serve multiple passengers occupying multiple passenger accommodation systems 100.

The passenger accommodation system 100 also includes a seat shell 106 that extends around the passenger seat 102 and provides privacy walls for a passenger occupying the passenger seat 102. The passenger accommodation system 100 also includes a table 108, which may include a top for holding food trays, beverages, reading materials, etc. and a hollow space for stowage of passenger items and/or other items provided for the passenger. In some examples, the seat shell 106 may extend from a floor to a ceiling of the aircraft or may only extend partway. The seat shell 106 may be configured to couple with and/or include a part of the passage door assembly 104. For example, the passage door assembly 104 may include a fixed wall 110 and a moveable door 112, and the fixed wall 110 may be integrally formed with the seat shell 106 or may otherwise be configured to couple with the seat shell 106.

Figure 2:
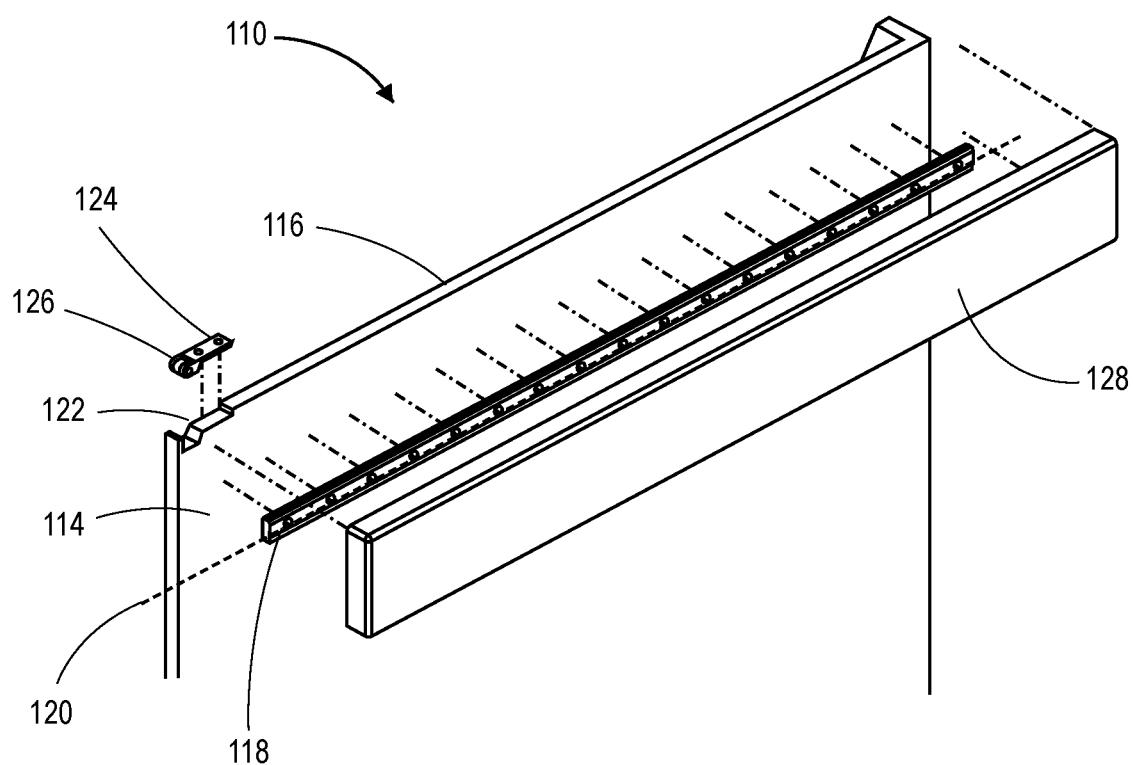
FIG. 2 shows an isometric view of a fixed wall of the passenger accommodation system of FIG. 1, according to at least one example.

FIG. 2 shows an isometric view of the fixed wall 110 of the passenger accommodation system 100 of FIG. 1, according to at least one example. The fixed wall 110, the moveable door 112, and any other portion of the passenger accommodation system 100 may be formed from any suitable material such as plastic, aluminum, glass, dense foam, wood, and the like. The fixed wall 110 includes an inward-facing surface 114 and a top edge surface 116. A slide track 118 is connected to the fixed wall 110 at the inward-facing surface 114. The slide track 118 extends along a longitudinal length of the fixed wall 110. The slide track 118 defines a slide axis 120, which defines how the moveable door 112 moves with respect to the fixed wall 110. The slide track 118 may be any suitable track, including channels, grooves, or the like configured to receive one or more sliding carriages to enable sliding movement, as described in detail with respect to FIG. 5.

At the top edge surface 116 of the fixed wall 110 is defined a recess 122, which is configured to receive a roller assembly 124. The roller assembly 124 includes a roller 126 that, as described with respect to later figures, is used to support the moveable door 112 when the moveable door 112 is operated in the emergency operating mode. The roller assembly 124 includes a tab for securing the roller assembly 124 in the recess 122. In some examples, a highest part of the roller 126, when the roller assembly 124 is mounted in the recess 122, may be slightly higher than the top edge surface 116. For example, the difference between the highest part of the roller 126 and the top edge surface 116 may be between 50 and 100 thousandths of an inch, less than 50 thousandths of an inch, or greater than 100 thousandths of an inch.

As illustrated in FIG. 2, a cover or bezel 128 may be releasably mounted to the inward-facing surface 114 of the fixed wall 110 to cover the slide track 118 and other assemblies described herein and mounted to the slide track 118.

Figure 3:
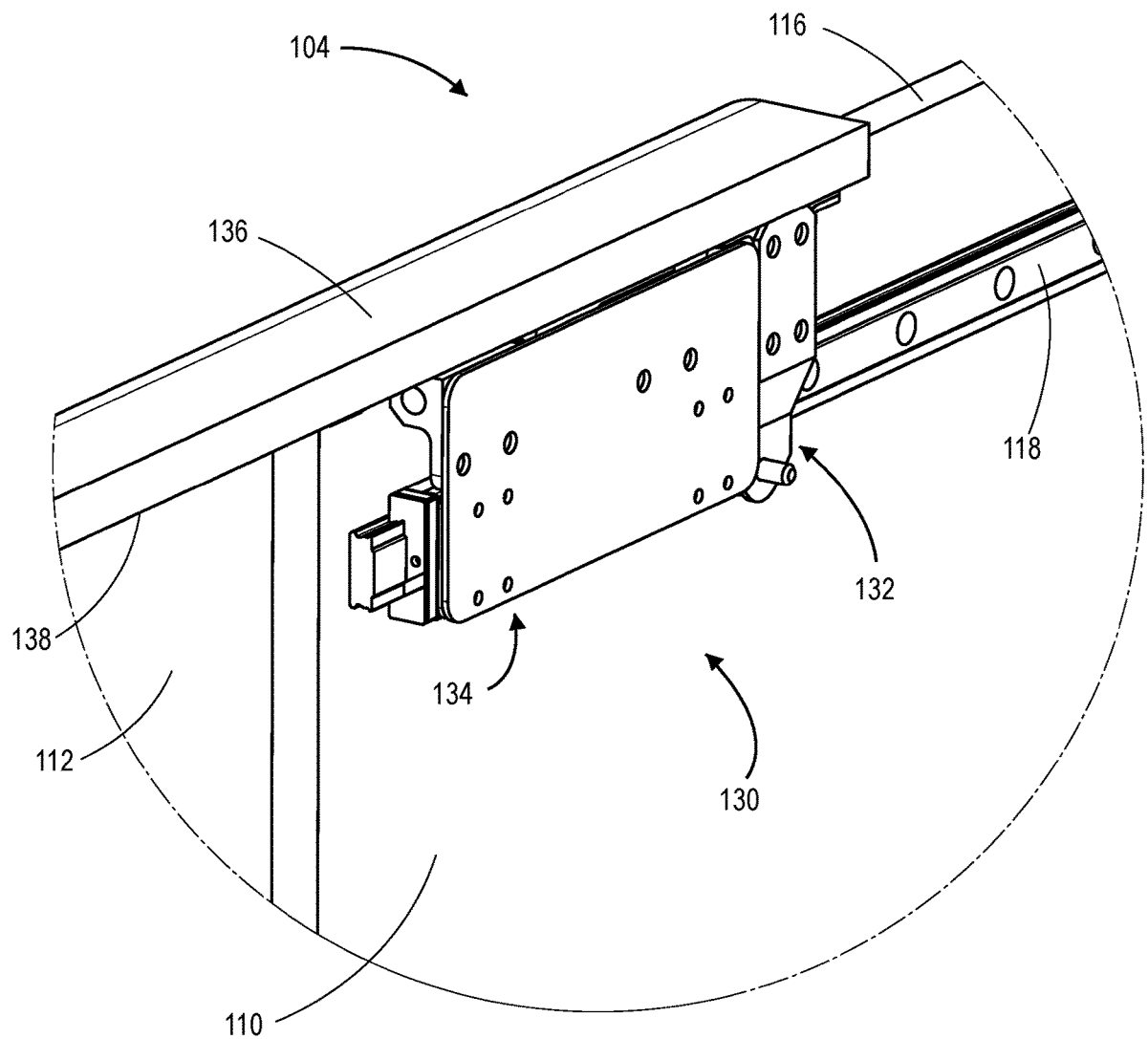
FIG. 3 shows a detailed isometric view of an emergency passage feature assembly of the passage door assembly of FIG. 1, according to at least one example.

FIG. 3 shows a detailed isometric view of an emergency passage feature assembly 130 of the passage door assembly 104 of FIG. 1, according to at least one example. The passage door assembly 104 includes the fixed wall 110, the slide track 118, the moveable door 112, and the emergency passage feature assembly 130. The emergency passage feature assembly 130 includes a door assembly 132 described with respect to FIG. 4 and a carriage assembly 134 described with respect to FIG. 5.

Figure 4:
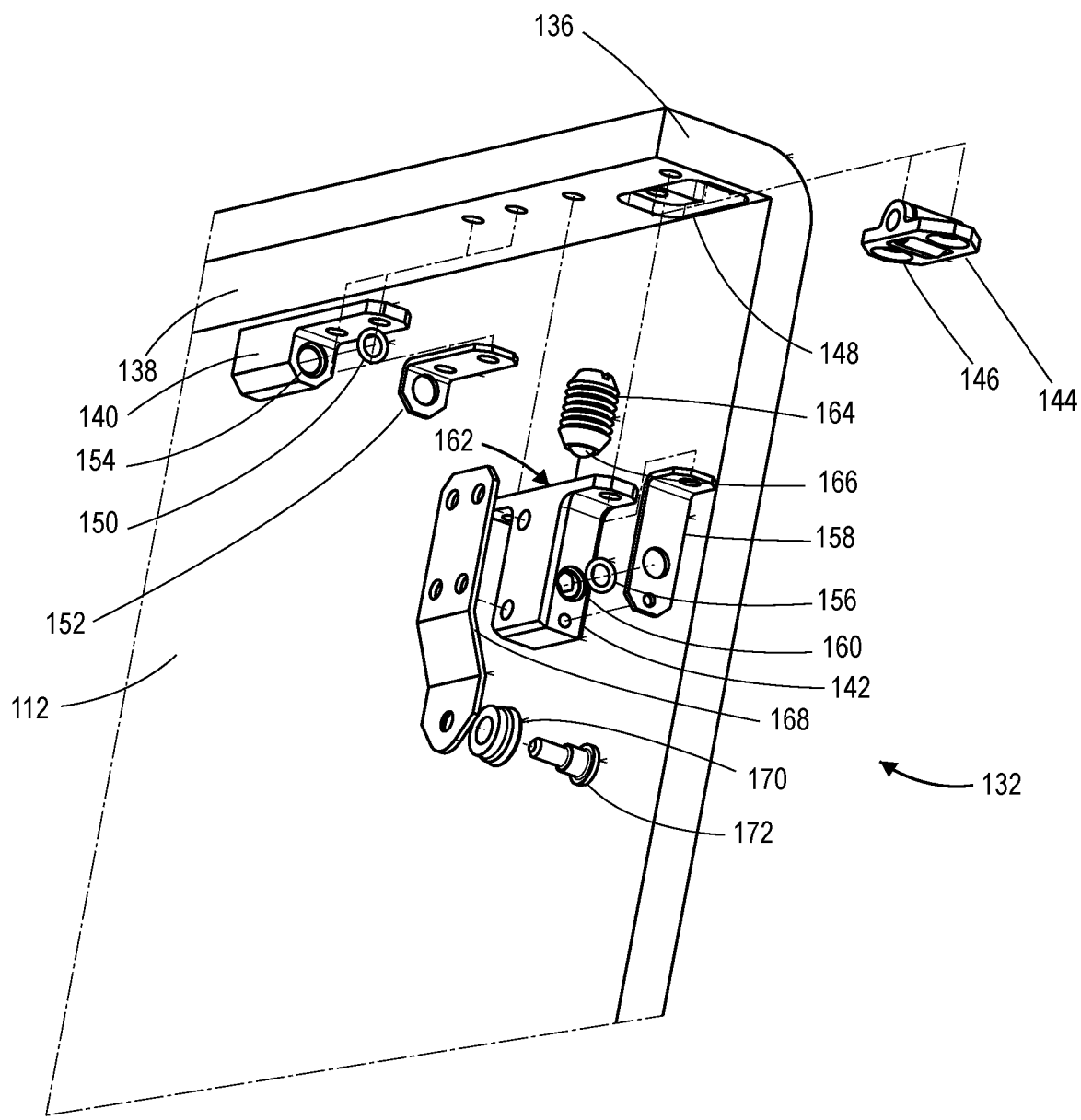
FIG. 4 shows an exploded isometric view of a door assembly of the passage door assembly of FIG. 1, according to at least one example.
Figure 6:
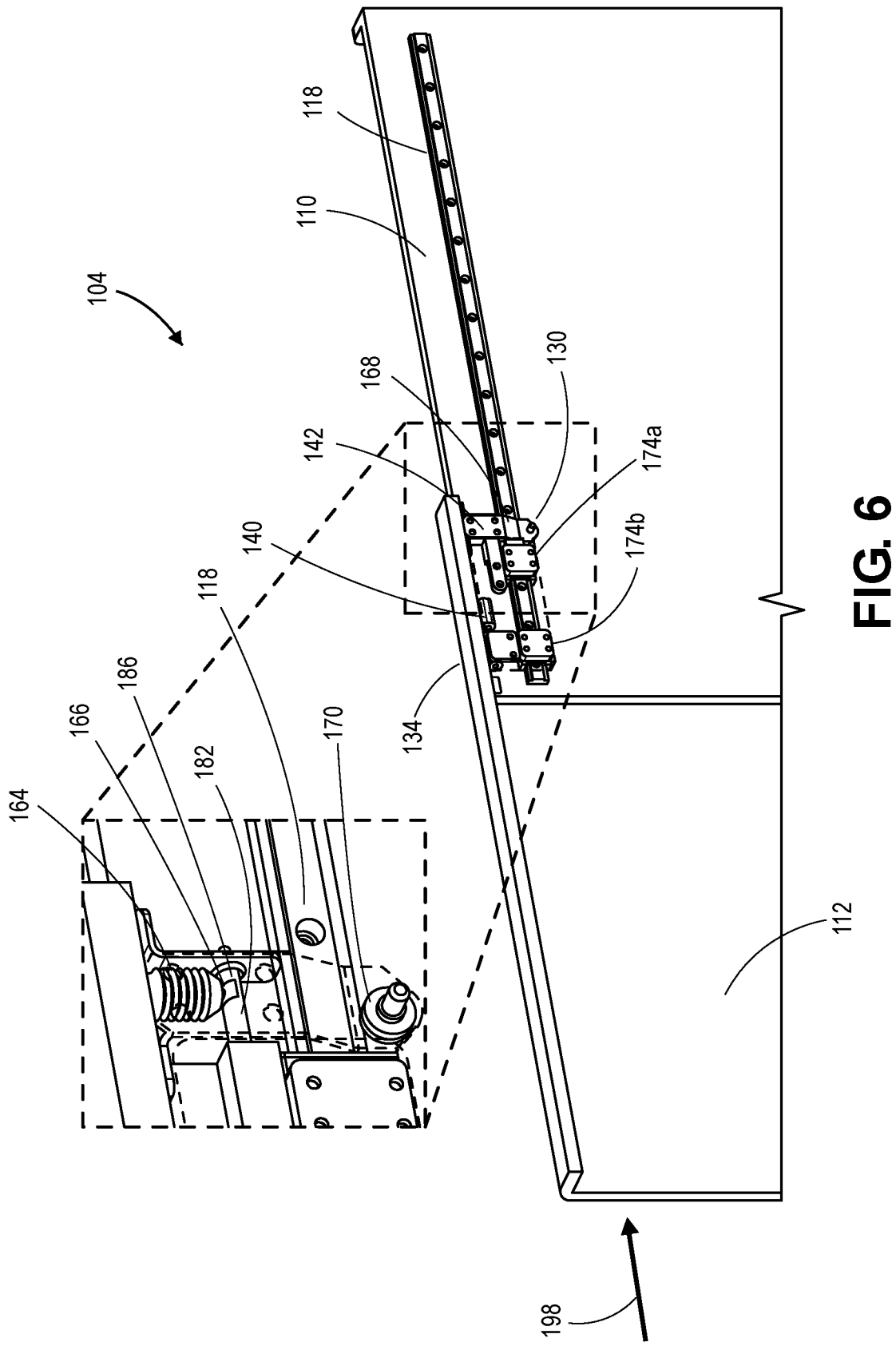
FIG. 6 shows an isometric view and a detail view of the emergency passage feature assembly of the passage door assembly of FIG. 1 in a normal operating mode, according to at least one example.
Figure 7:
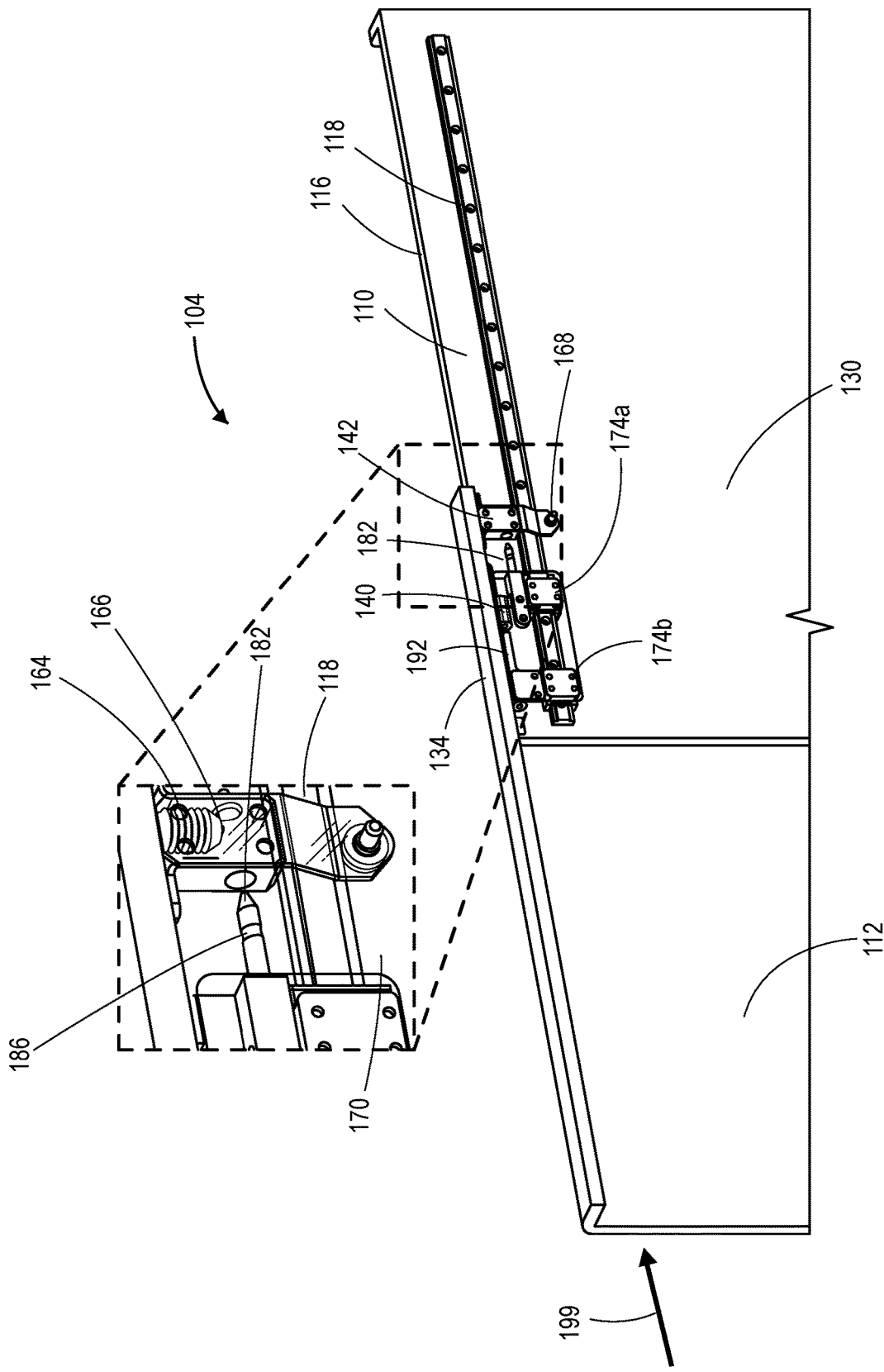
FIG. 7 shows an isometric view and a detail view of the emergency passage feature assembly of the passage door assembly of FIG. 1 in an emergency operating mode, according to at least one example.

The moveable door 112 includes a lip 136. When the moveable door 112 is coupled to the fixed wall, the lip 136 extends over and covers a portion of the top edge surface 116 of the fixed wall 110. The door assembly 132 is mounted to an underside 138 of the lip 136, as shown in FIG. 4. The carriage assembly 134 is a separate assembly that is slidably mounted to the slide track 118. As shown in FIGS. 6 and 7, the carriage assembly 134 may be releasably connected to the door assembly 132. When the two assemblies 132 and 134 are connected, the passage door assembly 104 is in the normal operating mode. When the two assemblies 132 and 134 are disconnected from each other, the passage door assembly 104 is in the emergency operating mode.

FIG. 4 shows an exploded isometric view of the door assembly 132 of the passage door assembly 104 of FIG. 1, according to at least one example. Generally, the emergency passage feature assembly 130 functions to connect the moveable door 112 to the carriage assembly 134. The door assembly 132 includes a first spigot block 140 and a second spigot block 142 configured to releasably receive corresponding latching spigots of the carriage assembly 134. The spigot blocks 140 and 142 are mounted to the underside 138 of the lip 136 of the moveable door 112. In some examples, only a single spigot block (e.g., the spigot block 142) may be provided. In some examples, more than two spigot blocks may be used.

A bottom roller assembly 144 is also mounted to the underside 138 of the lip 136. Like the roller assembly 124, the bottom roller assembly 144 includes a roller 146 and functions to enable sliding movement of the moveable door 112 when the emergency passage door assembly 130 is in the emergency operating mode. The bottom roller assembly 144 is mounted in a recess 148 formed in the underside 138. In some examples, the bottom roller assembly 144 is surface mounted to the underside 138.

The first spigot block 140 also includes an O-ring 150 and an O-ring retainer 152. The O-ring 150 is provided to prevent vibration when the first spigot block 140 receives a latching spigot into a spigot opening 154. The O-ring retainer 152 retains the O-ring 150. The O-ring 150 may also provide additional retaining forces for holding the latching spigot within the spigot opening 154 of the first spigot block 140. The spigot opening 154 may be shaped and sized to receive the latching spigot. For example, the spigot opening 154 may have a cylindrical profile, square profile, or any other shape, and the latching spigot may have a corresponding shape.

Like the first spigot block 140, the second spigot block 142 similarly includes an O-ring 156, an O-ring retainer 158, and a spigot opening 160. The parts function similarly to those described above with respect to the first spigot block 140. The second spigot block 142, sometimes referred to as a latching block, also includes catching opening 162 (not visible in FIG. 4) disposed in an axis that is about perpendicular with respect to an axis of the spigot opening 160. The catching opening 162 is configured to retain a catching mechanism 164. The catching mechanism 164, which functions as a door engagement latch, includes a threaded exterior surface corresponding to threads formed along an interior surface of the catching opening 162. The catching mechanism 164 includes a spring or other biasing member biased within an interior cavity and exerting a biasing force on a ball 166 disposed at a distal end of the catching mechanism 164. To assemble, the catching mechanism 164 is mounted in the catching opening 162 (e.g., via the threads, using a press-fit, glue, or other suitable method) at least until the ball 166 intersects a portion of the spigot opening 160. In operation, the ball 166 is configured to engage with a groove on a latching spigot of the carriage assembly in order to couple the two assemblies together. When an opening force exceeds some predefined threshold force (e.g., one that is a function of force present between the ball 166 and the groove of the latching spigot as a result of the biasing member), the ball 166 is removed from the groove and the latching spigot is free to be removed from the spigot opening 160.

The door assembly 132 also includes a roller bracket 168, a roller 170, and a roller support pin 172. The roller support pin 172 is held within the roller bracket 168 and retains and supports the roller 170. The roller bracket 168 is connected to the second spigot block 142. In some examples, the roller bracket 168 is connected to the underside 138. When the emergency passage feature assembly 130 is in the emergency operating mode, the roller 170 engages with the bottom side of the slide track 118 and retains the moveable door 112 by keeping the moveable door 112 from tipping off of slide track 118.

In some examples, the moveable door 112 may include an indicator that mechanically or electronically indicates a state of the door. For example, once the door assembly 132 has been decoupled from the carriage assembly 134, one or more state indicators (e.g., on an inside or outside surface of the moveable door 112, adjacent the passenger seat 102, or at any other location) may be changed to indicate that the system is operating in the emergency operating mode. Once the door assembly 132 has again been coupled to the carriage assembly 134, the state indicator may revert back to represent that the system is operating in the normal operating mode.

Figure 5:
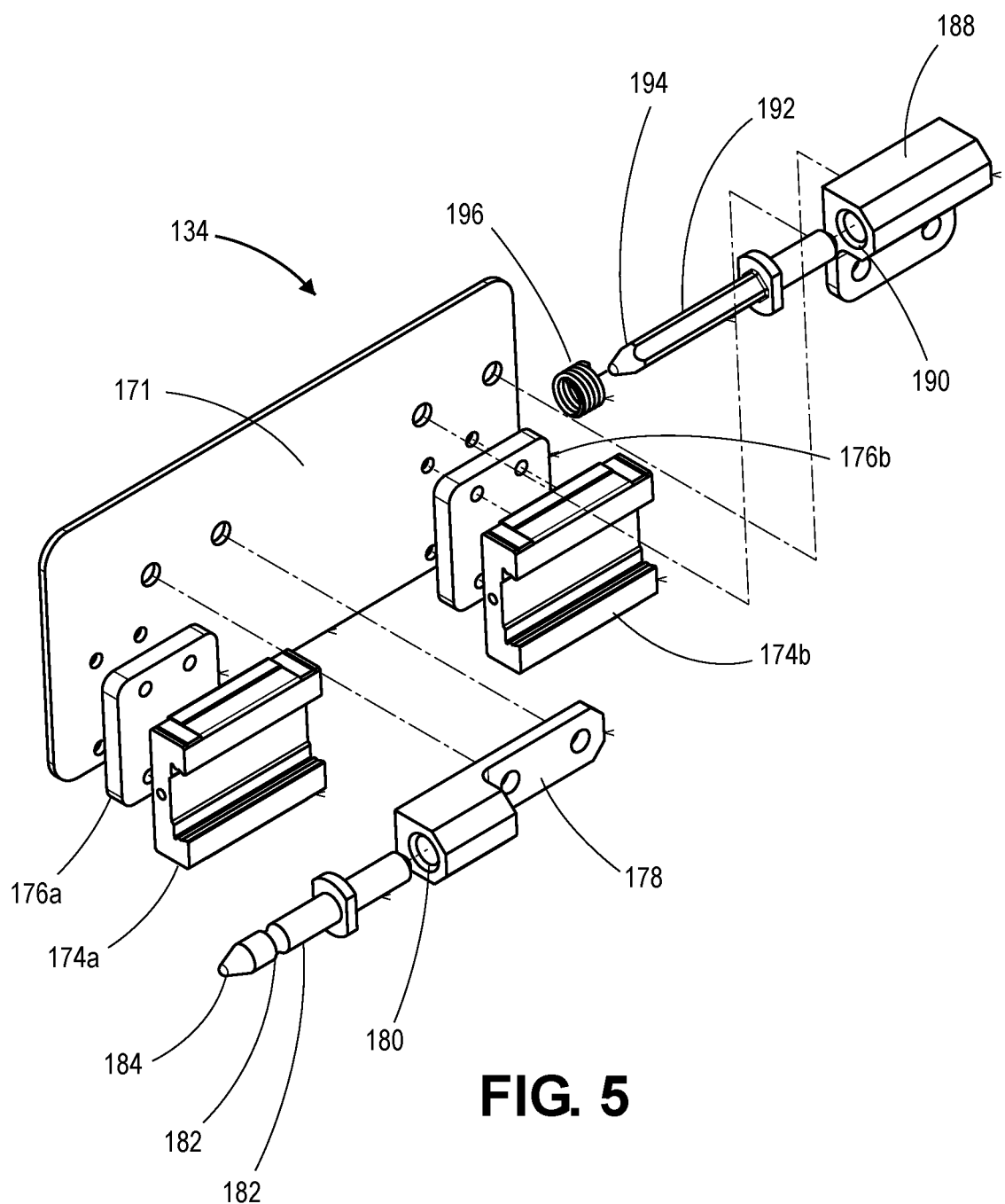
FIG. 5 shows an exploded isometric view of a carriage assembly of the passage door assembly of FIG. 1, according to at least one example.

FIG. 5 shows an exploded isometric view of the carriage assembly 134 of the passage door assembly 104 of FIG. 1, according to at least one example. For purposes of illustration, the carriage assembly 134 has been rotated about 180 degrees about the slide axis from the views illustrated in previous figures. The carriage assembly 134 includes a bracket 171 configured to retain a pair of carriage slide blocks 174a and 174b and corresponding spacers 176a and 176b. The carriage slide blocks 174 include one or more grooves corresponding to ridges of the slide track 118.

The carriage assembly 134 also includes an aft spigot block 178. The aft spigot block 178 includes an aft spigot block opening 180 configured to receive a first end of an aft latching spigot 182. The aft latching spigot 182 includes a distal end 184 at an opposite end of the aft spigot 182. The aft latching spigot 182 includes a groove 186 adjacent to the distal end 184. The groove 186 is configured to engage with the ball 166 of the catching mechanism 164 within the opening 160 when in the normal operating mode.

The carriage assembly 134 also includes a forward spigot block 188. The forward spigot block 188 includes a forward spigot block opening 190 configured to receive a first end of a forward latching spigot 192. The forward latching spigot 192 includes a distal end 194 at an opposite end of the forward latching spigot 192. The forward latching spigot 192, the distal end 194 in particular, is configured to be received by the spigot opening 154. The carriage assembly 134 also includes a spring 196 that is used to help release the carriage assembly 134 from the door assembly 132.

Although the embodiments described herein focus on spigot blocks and latching spigots to couple the carriage assembly 134 and the door assembly 132, any suitable alignment mechanism may be used in place of the described spigot blocks and latching spigots. Additionally, any suitable catching mechanism may be used to retain the latching spigot(s) in the latching blocks. For example, rather than a ball and spigot as described herein, the spigot blocks may include a retaining ring disposed along an interior surface of the spigot block and configured to frictionally and/or mechanically retain the latching spigot. This ring may dimensioned to have an opening that is smaller than an exterior dimension of the corresponding latching spigot (or a bulbous distal tip of the latching spigot). When a first opening force is exerted on the door, the latching spigot is retained by the retaining ring because the force exerted by the retaining ring on the latching spigot is greater than first opening force. When an emergency force is exerted on the door, the latching spigot is released by the retaining ring because the force exerted by the retaining ring on the latching spigot is less than the emergency opening force. In this manner, the emergency force will cause the latching spigot to translate within the block and past the retaining ring.

FIG. 6 shows an isometric view and a detail view of the emergency passage feature assembly 130 of the passage door assembly 104 of FIG. 1 in a normal operating mode, according to at least one example. In the view illustrated in FIG. 6, the bracket 171 is omitted to illustrate the components behind the bracket 171. In the normal operating mode, an opening force 198 that is within some predefined range (e.g., 3-4 lbs) is suitable for causing the moveable door 112 to slide with respect to the fixed wall 110 via the carriage slide blocks 174a and 174b. In some examples, the range may include values smaller than 3 and/or larger than 4. In any event, the opening force 198 may be configurable depending on the application.

In the normal operating mode, the forward latching spigot 192 is disposed within spigot block 140 and the aft latching spigot 182 is disposed within the spigot block 142. In particular, the aft latching spigot 182 is held within the spigot block 142 by the ball 166 of the catching mechanism 164 being forcibly held within the groove 186 of the aft latching spigot 182. In the normal operating mode, the roller 170 is spaced apart from the slide track 118 in a manner such that the roller 170 does not contact the slide track 118. Similarly, in the normal operating mode, neither of the rollers 126 or 146 is contacted to enable sliding of the moveable door 112. This is because the moveable door 112 is supported by the carriage assembly 134.

The fixed wall 110 may also include a mounting bracket for retaining electrical wires (e.g., within a cat-track assembly), lighting elements, and the like. For example, a cat-track assembly may be provided below the slide track 118, with a first end connected to the door assembly 132 and a second running within the mounting bracket and continuing to a power source. In some examples, the fixed wall 110 may also include a shroud for covering the mounting bracket and those items retained by the mounting bracket.

FIG. 7 shows an isometric view and a detail view of the emergency passage feature assembly 130 of the passage door assembly 104 of FIG. 1 in an emergency operating mode, according to at least one example. In the view illustrated in FIG. 7, the bracket 171 is omitted to illustrate the components behind the bracket 171. In the emergency operating mode, an emergency opening force 199 that is within some second predefined range (e.g., 6-8 lbs) that is greater than the first predefined range is suitable for overcoming the force exerted by the catching mechanism 164 on the groove 186 of the latching spigot 182 by the ball 166. When this occurs, the catching mechanism 164 effectively releases the latching spigot 182, thereby decoupling the moveable door 112 from the carriage assembly 134 and allowing the moveable door 112 to slide without the carriage assembly 134. In some examples, the second predefined range may include values smaller than 6 and/or larger than 8. In any event, the emergency opening force 199 may be configurable depending on the application.

In operation, as the latching spigots 182 and 192 are removed from the first and second spigot blocks 140 and 142, the entire moveable door 112 moves down toward the top edge surface 116 (e.g., by gravity towards the floor of the aircraft) at least until the roller 126 on the fixed wall 110 physically contacts the underside 138 of the lip 136 and the roller 146 physically contacts the top edge surface 116. In some examples, the moveable door 112 may move only a short distance (e.g., between 50 and 100 thousandths of an inch, less than 50 thousandths of an inch, or greater than 100 thousandths of an inch). In the emergency operating mode, the roller bracket 168 keeps the moveable door 112 from moving laterally and the roller 170 keeps the moveable door 112 from rotating away from the fixed wall 110 when the moveable door 112 extends into a closed position (e.g., when the door is between 50% and 100% closed).

In some examples, deploying the moveable door 112 (e.g., restoring the passage door assembly 104 to the normal operating mode) may include exerting a force on the moveable door 112 that is opposite in direction of and equal to or greater than in magnitude the emergency opening force 199. This "pushing" force causes the latching spigots 182 and 192 to enter the spigot blocks 140 and 142 such that at least one spigot block is held by the catching mechanism 164.

Figure 8:
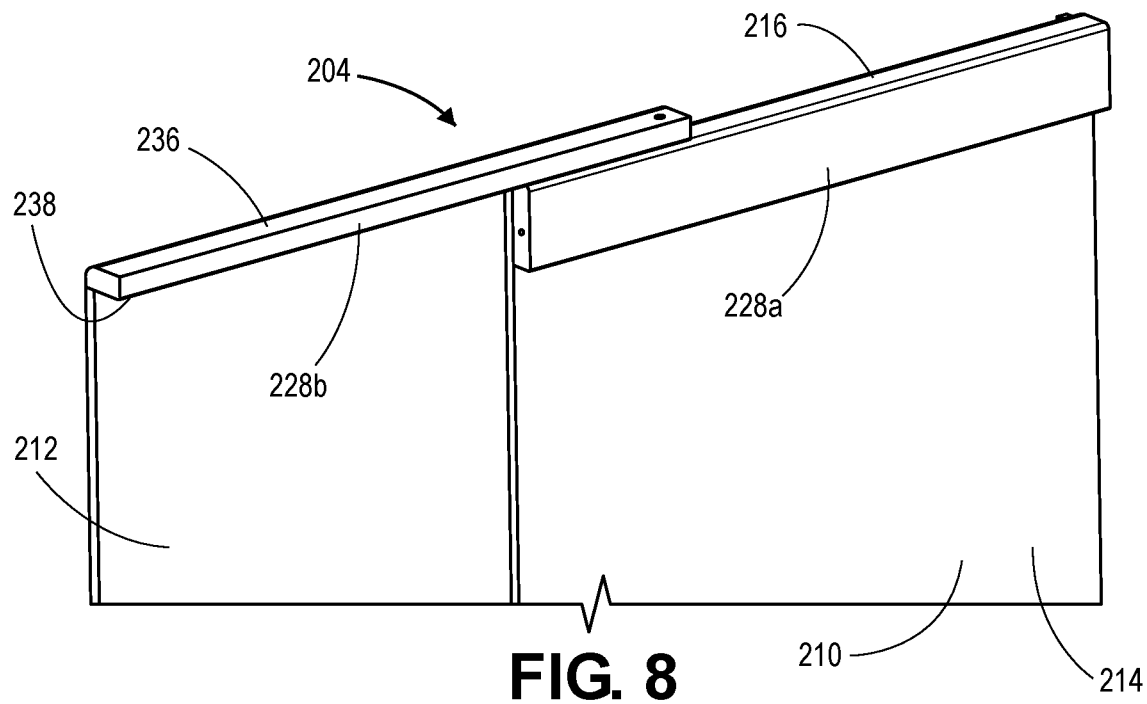
FIG. 8 shows an isometric view of a passage door assembly including an emergency passage feature assembly for use with the passenger accommodation system of FIG. 1, according to at least one example.

FIG. 8 shows an isometric view of a passage door assembly 204 including an emergency passage feature assembly 230 for use with the passenger accommodation system 100 of FIG. 1, according to at least one example. The passage door assembly 204 includes a fixed wall 210 and moveable door 212. The fixed wall 210 includes an inward-facing surface 214 and a top edge surface 216. The moveable door 212 includes a lip 236, which includes an underside 238. As illustrated in FIG. 8, a cover or bezel 228a may be releasably mounted to the inward-facing surface 214 of the fixed wall 210 to cover a primary slide track 218a (see FIG. 9) and other assemblies described herein and mounted to the primary slide track 218a. A cover or bezel 228b may be releasably mounted to the lip 236 to cover a secondary slide track 218b (see FIG. 9) and other assembles described herein and mounted to the secondary slide track 218b.

Figure 9:
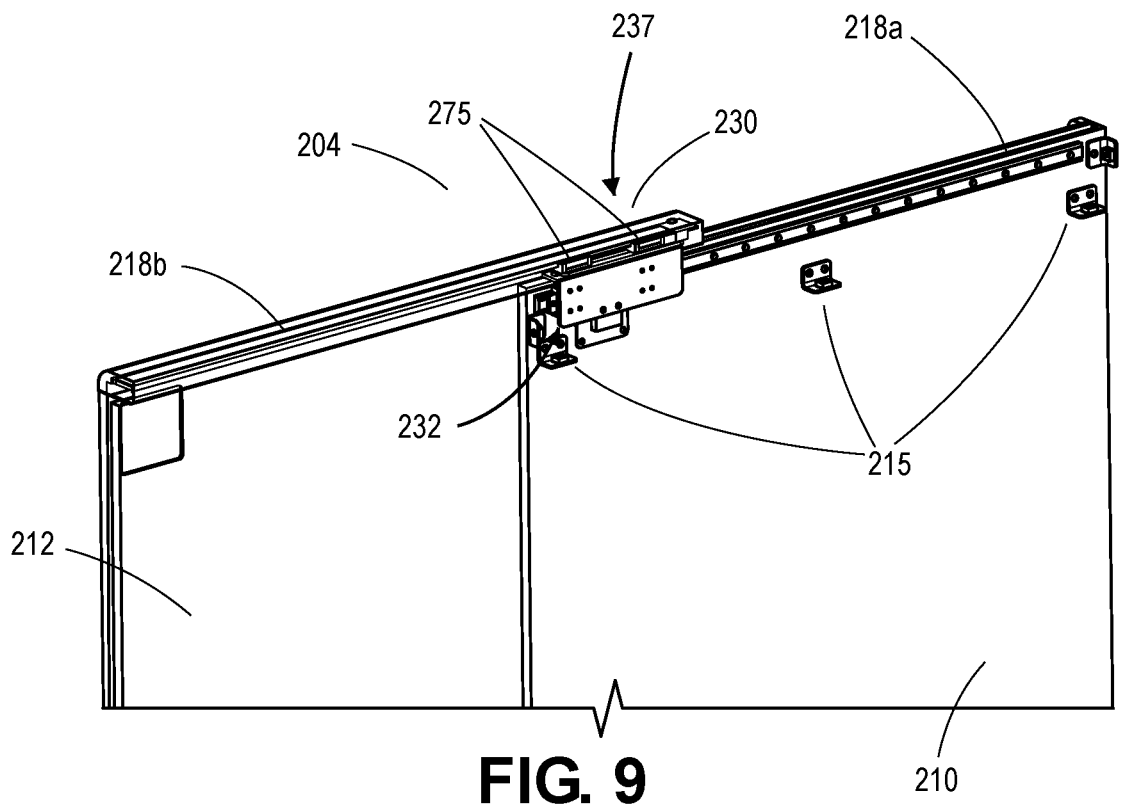
FIG. 9 shows an isometric view of the passage door assembly of FIG. 8 illustrating internal components of the emergency passage feature assembly, according to at least one example.

FIG. 9 shows an isometric view of the passage door assembly 204 of FIG. 8 illustrating internal components of the emergency passage feature assembly 230, according to at least one example. In FIG. 9, the shroud 228a has been removed, revealing shroud brackets 215, and shroud 228b has been made transparent to view internal components. The emergency passage feature assembly 230 includes the primary slide track 218a, the secondary slide track 218b, a carriage assembly 232, and a door carriage assembly 237. The primary slide track 218a is configured like the slide track 118. The secondary slide track 218b is mounted on the underside 238 of the lip 236. The carriage assembly 232 is generally configured like the carriage assembly 134. However, rather than the coupling being between a door assembly and the carriage assembly, in the embodiment of FIG. 9, the coupling occurs between the carriage assembly 232 and the door carriage assembly 237 includes a pair of carriage slide blocks 275.

Figure 10:
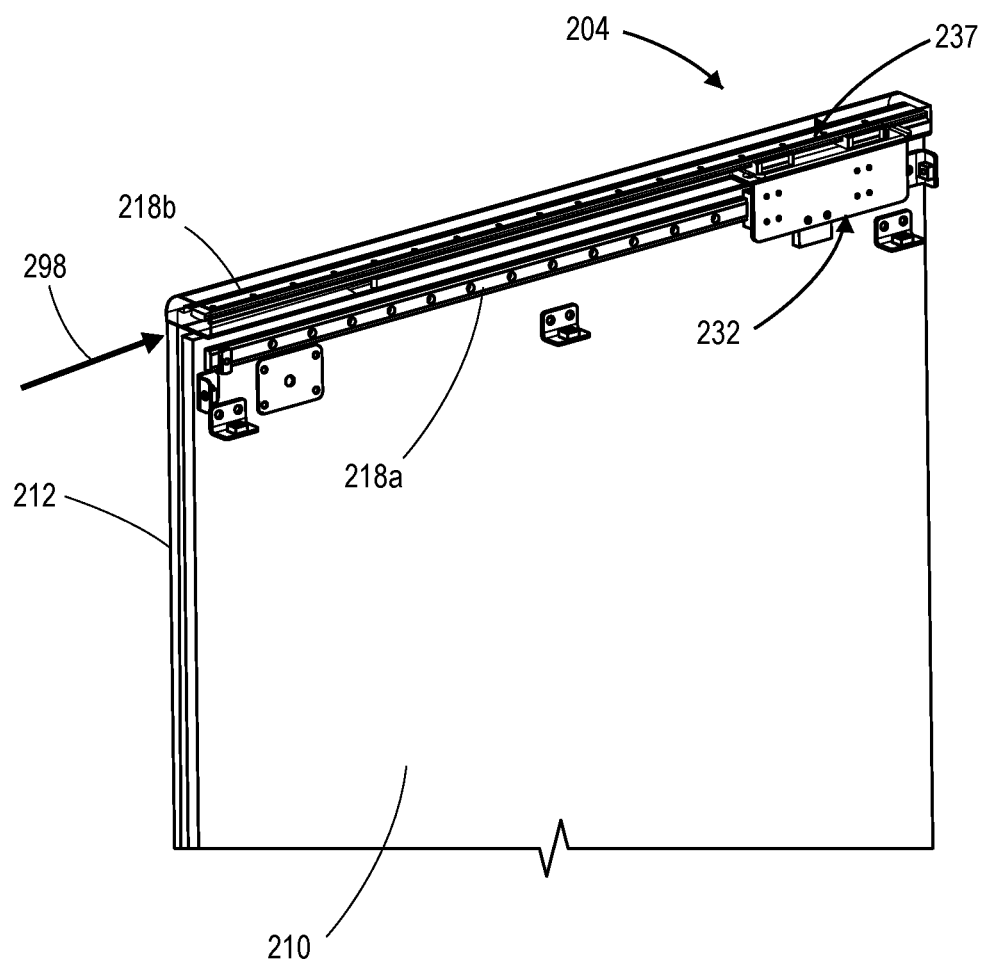
FIG. 10 shows an isometric view of the passage door assembly of FIG. 8 in a normal operating mode, according to at least one example.

FIG. 10 shows an isometric view of the passage door assembly 204 of FIG. 8 in a normal operating mode, according to at least one example. In a normal operating mode, the carriage assembly 232 is coupled to the door carriage assembly 237 via one or more latching spigots, corresponding spigot blocks, and catching mechanisms as described herein. In this manner, both assemblies 232 and 237 move together, as the carriage assembly 232 moves along the primary slide track 218a, responsive to an opening force 298. In particular, the moveable door 212 slides between an open and closed position along the primary slide track 218a in a normal operating manner.

Figure 11:
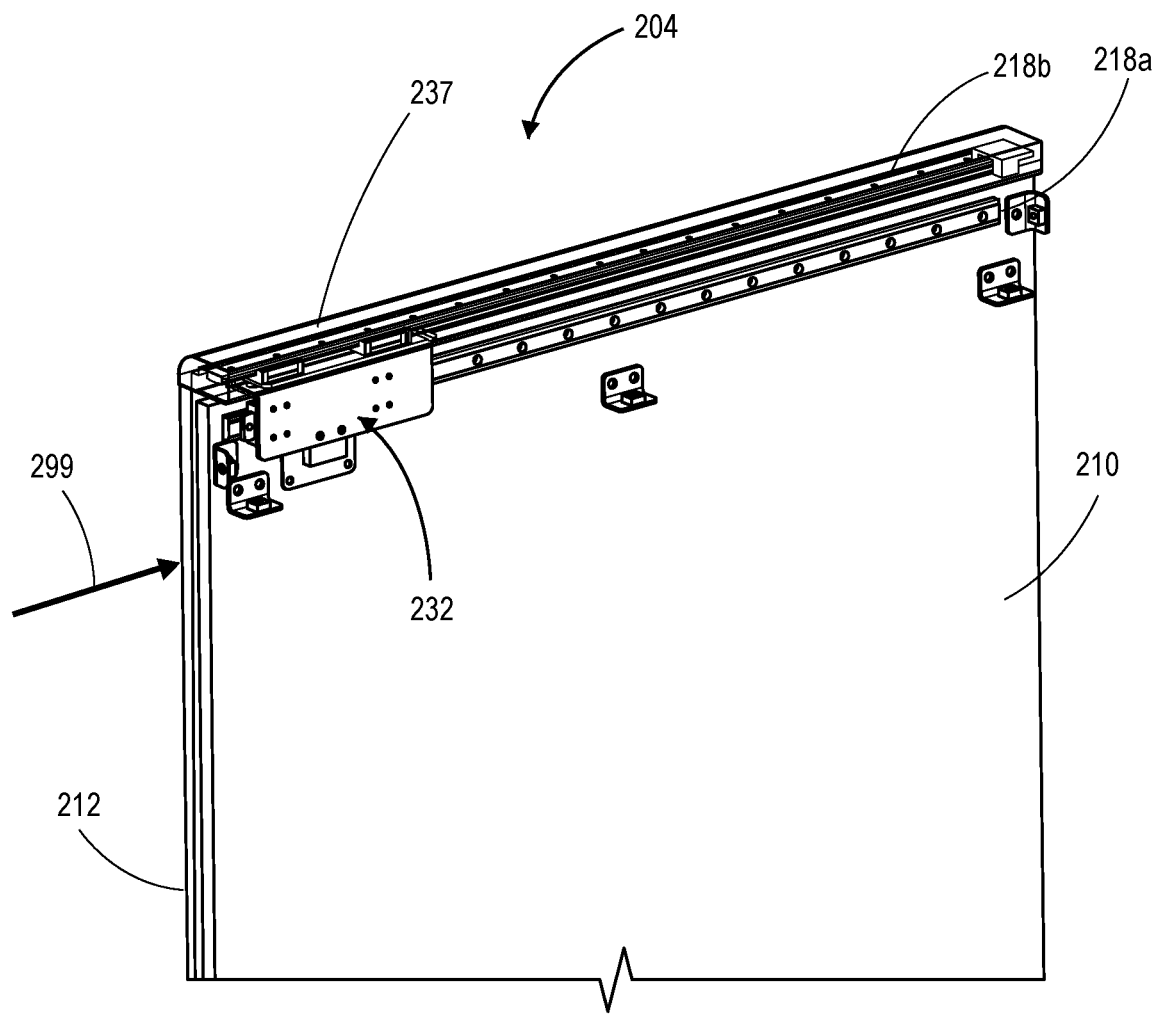
FIG. 11 shows an isometric view and a detail view of the passage door assembly of FIG. 8 in an emergency operating mode, according to at least one example.

FIG. 11 shows an isometric view of the passage door assembly 204 of FIG. 8 in an emergency operating mode, according to at least one example. In the emergency operating mode, the carriage assembly 232 is decoupled from the door carriage assembly 237, as one or more latching spigots connected to the carriage slide blocks are removed from corresponding spigot blocks and/or catching mechanisms as described herein. In this manner, the assemblies 232 and 237 remain stationary, as the moveable door 212 slides in and out along the secondary slide track 218b, responsive to an emergency opening force 299. In particular, the moveable door 212 slides between an open and closed position along the secondary slide track 218b in an emergency operating manner.

Figure 12:
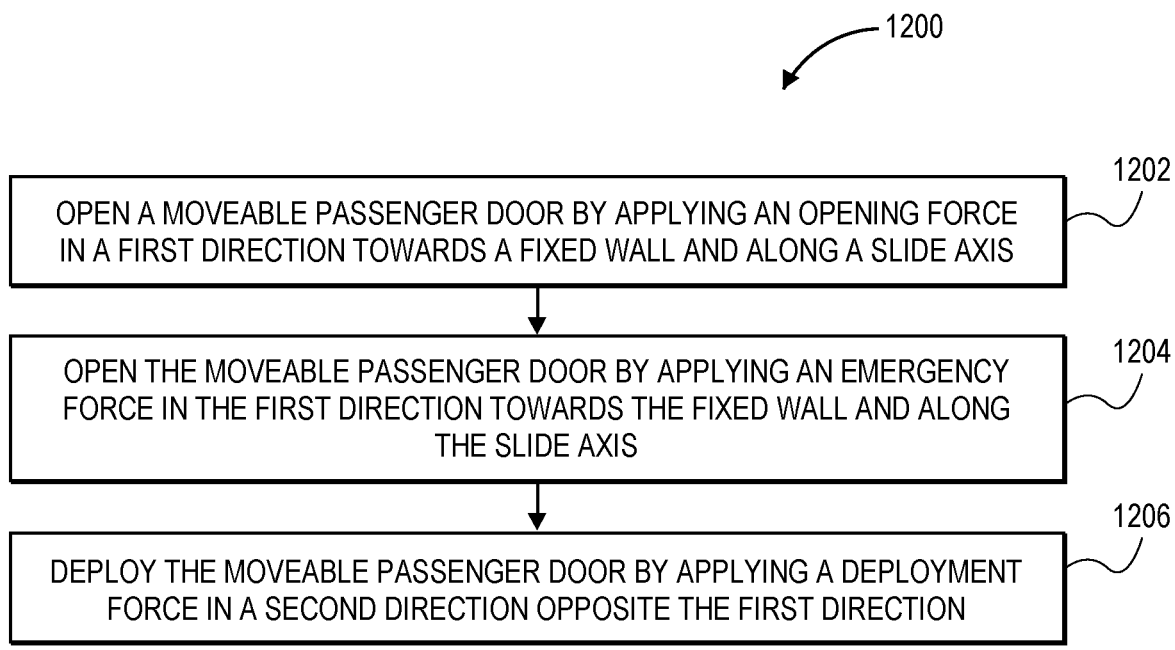
FIG. 12 shows a flow chart illustrating an example process of operating a moveable door including an emergency passage feature assembly, according to at least one example.

FIG. 12 shows a flow chart illustrating an example process 1200 of operating a moveable door including an emergency passage feature assembly, according to at least one example. The process 1200 may begin at 1202 by opening a moveable passenger door (e.g., 112) by applying an opening force (e.g., 198) in a first direction towards a fixed wall (e.g., 114) and along a slide axis (e.g., 120). The opening force may cause the moveable passenger door to translate with respect to the fixed wall via a carriage assembly (e.g., 134) that is removably coupled to the moveable passenger door via a door assembly (e.g., 132) and slidably connected to a slide track (e.g., 118) of the fixed wall.

At 1204, the process 1200 includes opening the moveable passenger door by applying an emergency force (e.g., 199) in the first direction towards the fixed wall and along the slide axis. The emergency force may cause the door assembly to decouple from the carriage assembly, and the moveable passenger door to translate with respect to the fixed wall via the door assembly independent of the carriage assembly. In some examples, the emergency force may cause the moveable passenger door to translate in a second direction at least until a portion of the door assembly physically contacts a top portion (e.g., 116) of the fixed wall. In some examples, the second direction may be substantially perpendicular to the first direction. In some examples, the portion of the door assembly is spaced apart (e.g., some non-zero distance such as less than 0.125 inches) from the top portion of the fixed wall prior to application of the emergency force.

At 1206, the process 1200 includes, after opening the moveable passenger door by applying the emergency force, deploying the moveable passenger door by applying a deployment force in a second direction opposite the first direction. The deployment force may cause the door assembly and the carriage assembly to couple together and return the moveable passenger door to the pre-emergency state. In some examples, the emergency force is greater than the opening force. In some examples, the deployment force is greater than or equal to the emergency force.

Following are further examples described to facilitate the understanding of the disclosure:

Example A. A door assembly mountable to a moveable door, comprising:
  a latching block configured to mount to the moveable door and alignable with a slide axis of a slide track that is mounted to a fixed wall, the latching block configured to selectively retain a latching spigot of a carriage assembly that is slidably mounted to the slide track, wherein the latching block is configured to:
  retain the latching spigot to enable sliding movement of the latching block and the carriage assembly on the slide track, when a first opening force is applied at the moveable door along the slide axis; and
  release the latching spigot to enable sliding movement of the latching block independent of the carriage assembly, when a second opening force that is greater than the first opening force is applied at the moveable door along the slide axis.

Example B. The door assembly of any preceding or subsequent examples, wherein a latching spigot opening is defined in a first side of the latching block and is configured to selectively receive the latching spigot.

Example C. The door assembly of any preceding or subsequent examples, wherein a catching opening is defined in a second side of the latching block, the door assembly further comprising a catching mechanism disposed in the catching opening and configured to translate within the catching opening between a first position in which the catching mechanism retains the latching spigot and a second position in which the latching spigot is released from the catching mechanism.

Example D. The door assembly of any preceding or subsequent examples, wherein the catching mechanism comprises a biasing member biased to cause translation of a distal end of the catching mechanism with respect to the latching spigot between the first position and the second position.

Example E. The door assembly of any preceding or subsequent examples, wherein the catching mechanism is configured to translate along a catching axis that is substantially perpendicular to the slide axis.

Example F. The door assembly of any preceding or subsequent examples, further comprising a door roller assembly configured to mount to the moveable door, the door roller assembly configured to physically contact the fixed wall and enable slidable movement of the moveable door when the latching spigot is released from the latching block.

Example G. The door assembly of any preceding or subsequent examples, wherein the door roller assembly is further configured to be physically separated from the fixed wall when the latching spigot is retained by the latching block.

Example H. The door assembly of any preceding or subsequent examples, further comprising a bottom roller bracket connected to the latching block and comprising a roller disposed below the slide track and configured to resist rotation of the moveable door when the latching spigot is released from the latching block.

Example I. A passenger accommodation system, comprising:
- a fixed wall forming a fixed part of a seating compartment;
- a moveable door forming a moveable part of the seating compartment;
- a slide track mounted to the fixed wall and defining a slide axis;
- a carriage assembly slidably mountable to the slide track via one or more slide carriages to enable slidable movement of the carriage assembly along the slide axis, the carriage assembly comprising a latching spigot aligned with the slide axis; and
- a door assembly configured to mount to the moveable door and mate with the carriage assembly to enable slidable movement of the moveable door with respect to the fixed wall, the door assembly comprising a latching block aligned with the slide axis and configured to selectively receive the latching spigot by at least:
  - responsive to a first opening force applied at the moveable door, retaining the latching spigot to enable the moveable door, the carriage assembly, and the door assembly to slide along the slide track; and
  - responsive to a second opening force applied at the moveable door, releasing the latching block to enable the latching block and the moveable door to slide with respect to the fixed wall independent of the carriage assembly.

Example J. The passenger accommodation system of any preceding or subsequent examples, wherein the second opening force is greater than the first opening force.

Example K. The passenger accommodation system of any preceding or subsequent examples, wherein the carriage assembly further comprises an alignment spigot aligned with the slide axis, and wherein the door assembly further comprises an alignment block aligned with the slide axis and configured to selectively receive the alignment spigot.

Example L. The passenger accommodation system of any preceding or subsequent examples, wherein the moveable door comprises a lip extending in the direction of the slide axis and to which is mounted a door roller assembly comprising one or more rollers.

Example M. The passenger accommodation system of any preceding or subsequent examples, wherein the moveable door sliding with respect to the fixed wall independent of the carriage assembly comprises the one or more rollers of the door roller assembly in physically contacting a top surface of the fixed wall, enabling slidable movement of the moveable door with respect to the fixed wall, and supporting the weight of the moveable door.

Example N. The passenger accommodation system of any preceding or subsequent examples, wherein the latching block further comprises a catching mechanism disposed within the latching block and configured to translate between a first position in which the catching mechanism retains the latching spigot responsive to the first opening force and a second position in which the catching mechanism releases the latching spigot responsive to the second opening force.

Example O. The passenger accommodation system of any preceding or subsequent examples, wherein the catching mechanism comprises a biasing member biased to cause translation of a distal end of the catching mechanism with respect to the latching spigot in a direction that is substantially perpendicular to the slide axis between the first position and the second position.

Example P. The passenger accommodation system of any preceding or subsequent examples, further comprising a passenger seat connected to the fixed wall, the moveable passenger door enabling passenger egress to and from the passenger seat responsive to the first opening force and the second opening force.

Example Q. A method of operating a moveable passenger door, comprising:
- opening the moveable passenger door by applying an opening force in a first direction towards a fixed wall and along a slide axis, the opening force causing the moveable passenger door to translate with respect to the fixed wall via a carriage assembly that is removably coupled to the moveable passenger door via a door assembly and slidably connected to a slide track of the fixed wall; and
- opening the moveable passenger door by applying an emergency force in the first direction towards the fixed wall and along the slide axis, the emergency force causing:
  - the door assembly to decouple from the carriage assembly; and
  - the moveable passenger door to translate with respect to the fixed wall via the door assembly independent of the carriage assembly.

Example R. The method of any preceding or subsequent examples, further comprising, after opening the moveable passenger door by applying the emergency force, deploying the moveable passenger door by applying a deployment force in a second direction opposite the first direction, the deployment force causing the door assembly and the carriage assembly to couple together.

Example S. The method of any preceding or subsequent examples, wherein the emergency force is greater than the opening force.

Example T. The method of any preceding or subsequent examples, wherein the emergency force further causes the moveable passenger door to translate in a second direction at least until a portion of the door assembly physically contacts a top portion of the fixed wall, wherein the second direction is substantially perpendicular to the first direction, and wherein the portion of the door assembly is spaced apart from the top portion of the fixed wall prior to application of the emergency force.

Different arrangements of the components depicted in the drawings or described above, as well as components and steps not shown or described, are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

The terms "invention," "the invention," "this invention," and "the present invention" used in this patent are intended to refer broadly to all of the subject matter of this patent and the patent claims below. Statements containing these terms should be understood not to limit the subject matter described herein or to limit the meaning or scope of the patent claims below.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a," "an," and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,"), unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc. may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

That which is claimed is:

1. A passenger accommodation system, comprising:
   a fixed wall forming a fixed part of a seating compartment;
   a moveable door forming a moveable part of the seating compartment;
   a slide track mounted to the fixed wall and defining a slide axis;
   a carriage assembly slidably mountable to the slide track via one or more slide carriages to enable slidable movement of the carriage assembly along the slide axis, the carriage assembly comprising an elongated latching spigot, wherein the elongated latching spigot is elongated in a direction parallel to the slide axis; and
   a door assembly configured to mount to the moveable door and mate with the carriage assembly to enable slidable movement of the moveable door with respect to the fixed wall, the door assembly comprising a latching block aligned with the slide axis and configured to selectively receive the latching spigot by at least:
      responsive to a first opening force applied at the moveable door, retaining the latching spigot to enable the moveable door, the carriage assembly, and the door assembly to slide along the slide track; and
      responsive to a second opening force applied at the moveable door, releasing the latching block to enable the latching block and the moveable door to slide with respect to the fixed wall independent of the carriage assembly.

2. The passenger accommodation system of claim 1, wherein the second opening force is greater than the first opening force.

3. The passenger accommodation system of claim 1, wherein the carriage assembly further comprises an alignment spigot aligned with the slide axis, and wherein the door assembly further comprises an alignment block aligned with the slide axis and configured to selectively receive the alignment spigot.

4. The passenger accommodation system of claim 1, wherein the moveable door comprises a lip extending in the direction of the slide axis and to which is mounted a door roller assembly comprising one or more rollers.

5. The passenger accommodation system of claim 4, wherein the moveable door sliding with respect to the fixed wall independent of the carriage assembly comprises the one or more rollers of the door roller assembly in physically contacting a top surface of the fixed wall, enabling slidable movement of the moveable door with respect to the fixed wall, and supporting the weight of the moveable door.

6. The passenger accommodation system of claim 1, wherein the latching block further comprises a catching mechanism disposed within the latching block and configured to translate between a first position in which the catching mechanism retains the latching spigot responsive to the first opening force and a second position in which the catching mechanism releases the latching spigot responsive to the second opening force.

7. The passenger accommodation system of claim 6, wherein the catching mechanism comprises a biasing member biased to cause translation of a distal end of the catching mechanism with respect to the latching spigot in a direction that is substantially perpendicular to the slide axis between the first position and the second position.

8. The passenger accommodation system of claim 1, further comprising a passenger seat connected to the fixed wall, the moveable passenger door enabling passenger egress to and from the passenger seat responsive to the first opening force and the second opening force.

9. A method of operating a moveable passenger door, comprising:
opening the moveable passenger door by applying an opening force in a first direction towards a fixed wall and along a slide axis, the opening force causing the moveable passenger door to translate with respect to the fixed wall via a carriage assembly that is removably coupled to the moveable passenger door via a door assembly and slidably connected to a slide track of the fixed wall; and
opening the moveable passenger door by applying an emergency force in the first direction towards the fixed wall and along the slide axis, the emergency force causing:
the door assembly to decouple from the carriage assembly; and
the moveable passenger door to translate with respect to the fixed wall via the door assembly independent of the carriage assembly, the door assembly and the carriage assembly slidable along the slide track.

10. The method of claim 9, further comprising, after opening the moveable passenger door by applying the emergency force, deploying the moveable passenger door by applying a deployment force in a second direction opposite the first direction, the deployment force causing the door assembly and the carriage assembly to couple together.

11. The method of claim 9, wherein the emergency force is greater than the opening force.

12. The method of claim 9, wherein the emergency force further causes the moveable passenger door to translate in a second direction at least until a portion of the door assembly physically contacts a top portion of the fixed wall, wherein the second direction is substantially perpendicular to the first direction, and wherein the portion of the door assembly is spaced apart from the top portion of the fixed wall prior to application of the emergency force.

13. A method of operating a moveable passenger door, comprising:
opening the moveable passenger door by applying an opening force in a first direction towards a fixed wall and along a slide axis, the opening force causing the moveable passenger door to translate with respect to the fixed wall via a carriage assembly that is removably coupled to the moveable passenger door via a door assembly and slidably connected to a slide track of the fixed wall; and
opening the moveable passenger door by applying an emergency force in the first direction towards the fixed wall and along the slide axis, the emergency force causing:
the door assembly to decouple from the carriage assembly; and
the moveable passenger door to translate with respect to the fixed wall via the door assembly independent of the carriage assembly,
wherein the emergency force further causes the moveable passenger door to translate in a second direction at least until a portion of the door assembly physically contacts a top portion of the fixed wall, wherein the second direction is substantially perpendicular to the first direction, and wherein the portion of the door assembly is spaced apart from the top portion of the fixed wall prior to application of the emergency force.

* * * * *